(12) United States Patent
Horng et al.

(10) Patent No.: US 8,207,640 B2
(45) Date of Patent: Jun. 26, 2012

(54) ROTATION ASSEMBLY FOR MOTOR

(75) Inventors: Alex Horng, Kaohsiung (TW); Hung-Jen Chuang, Kaohsiung (TW); Duo-Nien Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 259 days.

(21) Appl. No.: 12/773,109

(22) Filed: May 4, 2010

(65) Prior Publication Data

US 2011/0273062 A1 Nov. 10, 2011

(51) Int. Cl.
*H02K 7/00* (2006.01)

(52) U.S. Cl. ............................ 310/67 R; 310/91

(58) Field of Classification Search ............ 310/67 R, 310/89–90, 91
See application file for complete search history.

(56) References Cited

U.S. PATENT DOCUMENTS

| | | | |
|---|---|---|---|
| 5,744,882 A * | 4/1998 | Teshima et al. | 310/67 R |
| 5,880,545 A | 3/1999 | Takemura et al. | |
| 6,144,523 A * | 11/2000 | Murthy et al. | 360/99.08 |
| 6,256,289 B1 | 7/2001 | Miyamoto | |
| 6,400,049 B1 * | 6/2002 | Lai | 310/67 R |
| 6,657,339 B2 * | 12/2003 | Herndon et al. | 310/90 |
| 6,741,001 B2 * | 5/2004 | Takayanagi | 310/90 |
| 6,756,715 B2 * | 6/2004 | Hirose et al. | 310/90 |
| 2002/0079754 A1 * | 6/2002 | Lai | 310/67 R |
| 2005/0006965 A1 * | 1/2005 | Sato et al. | 310/67 R |
| 2006/0284503 A1 * | 12/2006 | Lin et al. | 310/90 |

* cited by examiner

*Primary Examiner* — Thanh Lam
(74) *Attorney, Agent, or Firm* — Alan Kamrath; Kamrath IP Lawfirm, PA

(57) ABSTRACT

A rotation assembly for a motor comprises a hub, a shaft, a buckling member and a fixing plate. The hub has a through-hole and an assembling portion. The through-hole has a first opening and a second opening opposing to the first opening. The assembling portion is located surrounding the first opening. The shaft is inserted into the through-hole of the hub and has a first end and a second end, wherein a fixing slot and a restrain portion are located between the first end and the second end. The buckling member is coupled to the fixing slot of the shaft so as to prevent the shaft from disengaging from the hub. The fixing plate is coupled to the assembling portion of the hub and has an abutting portion abutting with the restrain portion of the shaft for preventing the shaft from rotating about the hub.

31 Claims, 14 Drawing Sheets

ROTATION ASSEMBLY FOR MOTOR

BACKGROUND OF THE INVENTION

1. Field of the Invention

The present invention generally relates to a rotation assembly and, more particularly, to a rotation assembly that may be coupled to a permanent magnet in order to form a rotor for a motor.

2. Description of the Related Art

Referring to FIG. 1, Taiwan Patent Publication No. 443671 discloses a conventional motor 8. The motor 8 includes a base 81, a stator 82 and a rotor 83. The base 81 is mounted with a shaft tube 811 and the stator 82 is coupled with the shaft tube 811. The rotor 83 includes a hub 831, a shaft 832 and a permanent magnet 833. The shaft 832 has an end formed on the hub 831 in an injection molding manner, as well as another end extending into and rotatably coupling with the shaft tube 811. The permanent magnet 833 is mounted on an inner face of the hub 831. With the above-described structure, the rotor 83 can start rotating when the stator 82 is electrified to generate an alternative magnetic field which interacts with the permanent magnet 833 of the rotor 83.

During manufacturing of the motor 8, the shaft 832 is firstly formed on the hub 831 in an integral injection manner, and the shaft 832 is then inserted into the shaft tube 811. However, the integrally-formed shaft 832 and hub 831 may not suit some conventional motors. Specifically, some conventional motors require a hub to be lastly assembled to a shaft only after the shaft is assembled to other members such as a base or stator.

Referring to FIG. 2, for example, a conventional rotation assembly 9 with non-integrally formed shaft and hub is shown. The rotation assembly 9 comprises a hub 91, a shaft 92 and a buckling member 93. The hub 91 has an assembly hole 911 having a plane face 912 and a protruding face 913 formed on an inner circumferential wall thereof. The shaft 92 has a fixing slot 921, a plane face 922 and a protruding face 923. The shaft 92 is inserted into the assembly hole 911 of the hub 91 in a way that the plane face 922 abuts with the plane face 912 in order to prevent the shaft 92 from rotating about the hub 91. In addition, the protruding face 923 also abuts with the protruding face 913. Thus, the buckling member 93 may prevent the shaft 92 from disengaging from the hub 91 after the buckling member 93 is inserted into the fixing slot 921.

The hub 91 of the rotation assembly 9 is generally made of a plastic material. However, the plastic material is elastic and tends to wear down easily. Therefore, when the rotation assembly 9 is coupled to a permanent magnet (not shown) to form a rotor for a motor (not shown), the shaft 92 is not efficiently prevented from rotating about the hub 91 merely relying on the abutting relation between the plane faces 912 and 922, especially during long-term rotation of the motor. Furthermore, a gap is formed between the plane faces 922 and 912 as the plane faces 922 and 912 tend to wear down easily after long-term rotation of the rotation assembly 9. As a result, loosing between the shaft 92 and the assembly hole 911 is caused, which not only can not efficiently prevent the shaft 92 from rotating about the hub 91, but also cause problems such as noises generated.

SUMMARY OF THE INVENTION

It is therefore the primary objective of this invention to overcome the drawbacks of the conventional rotation assembly by providing a rotation assembly having a shaft better prevented from rotating about a hub thereof.

The invention discloses a rotation assembly for a motor comprising a hub, a shaft, a buckling member and a fixing plate. The hub has a through-hole and an assembling portion. The through-hole has a first opening and a second opening opposing to the first opening. The assembling portion is located surrounding the first opening. The shaft is inserted into the through-hole of the hub and has a first end and a second end, wherein a fixing slot and a restrain portion are located between the first end and the second end. The buckling member is coupled to the fixing slot of the shaft so as to prevent the shaft from disengaging from the hub. The fixing plate is coupled to the assembling portion of the hub and has an abutting portion abutting with the restrain portion of the shaft for preventing the shaft from rotating about the hub.

Furthermore, the invention discloses a rotation assembly for a motor comprising a hub, a shaft and a fixing plate. The hub has a through-hole and an assembling portion. The through-hole has a first opening and a second opening opposing to the first opening. The assembling portion is located surrounding the first opening. The shaft is inserted into the through-hole of the hub and has a first end and a second end, wherein a fixing slot and a restrain portion are located between the first end and the second end. The fixing plate is coupled to the fixing slot of the shaft and the assembling portion of the hub and has an abutting portion abutting with the restrain portion of the shaft for preventing the shaft from rotating about the hub.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
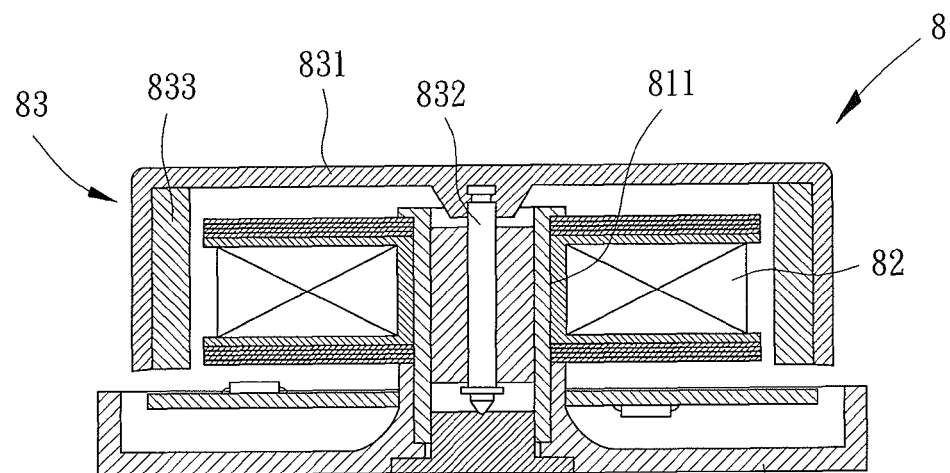
FIG. 1 shows a side cross-sectional view of a conventional motor.
Figure 2:
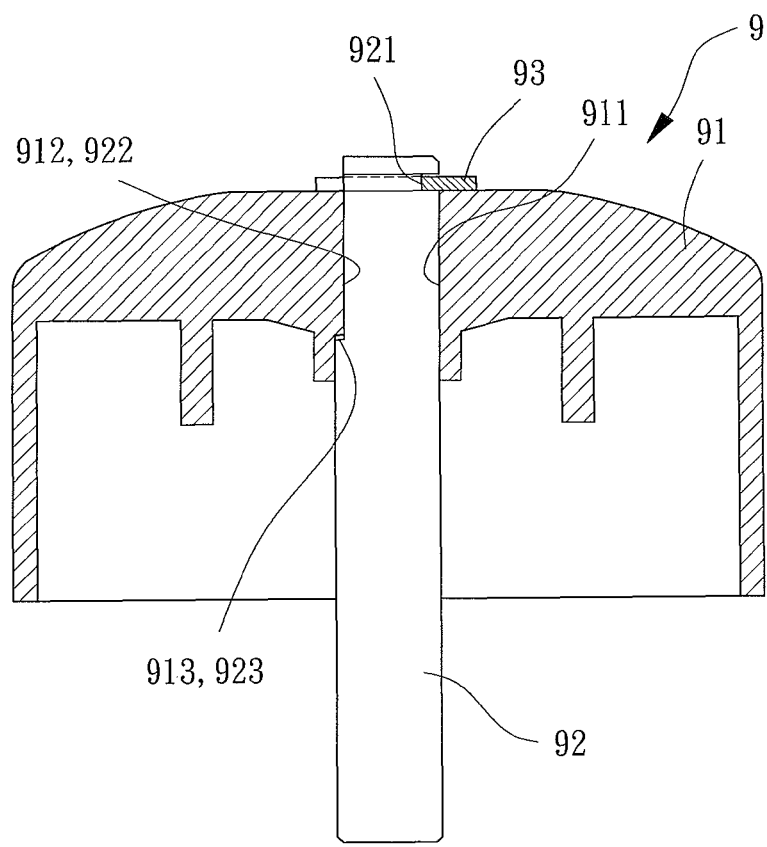
FIG. 2 shows a side cross-sectional view of a conventional rotation assembly.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 3:
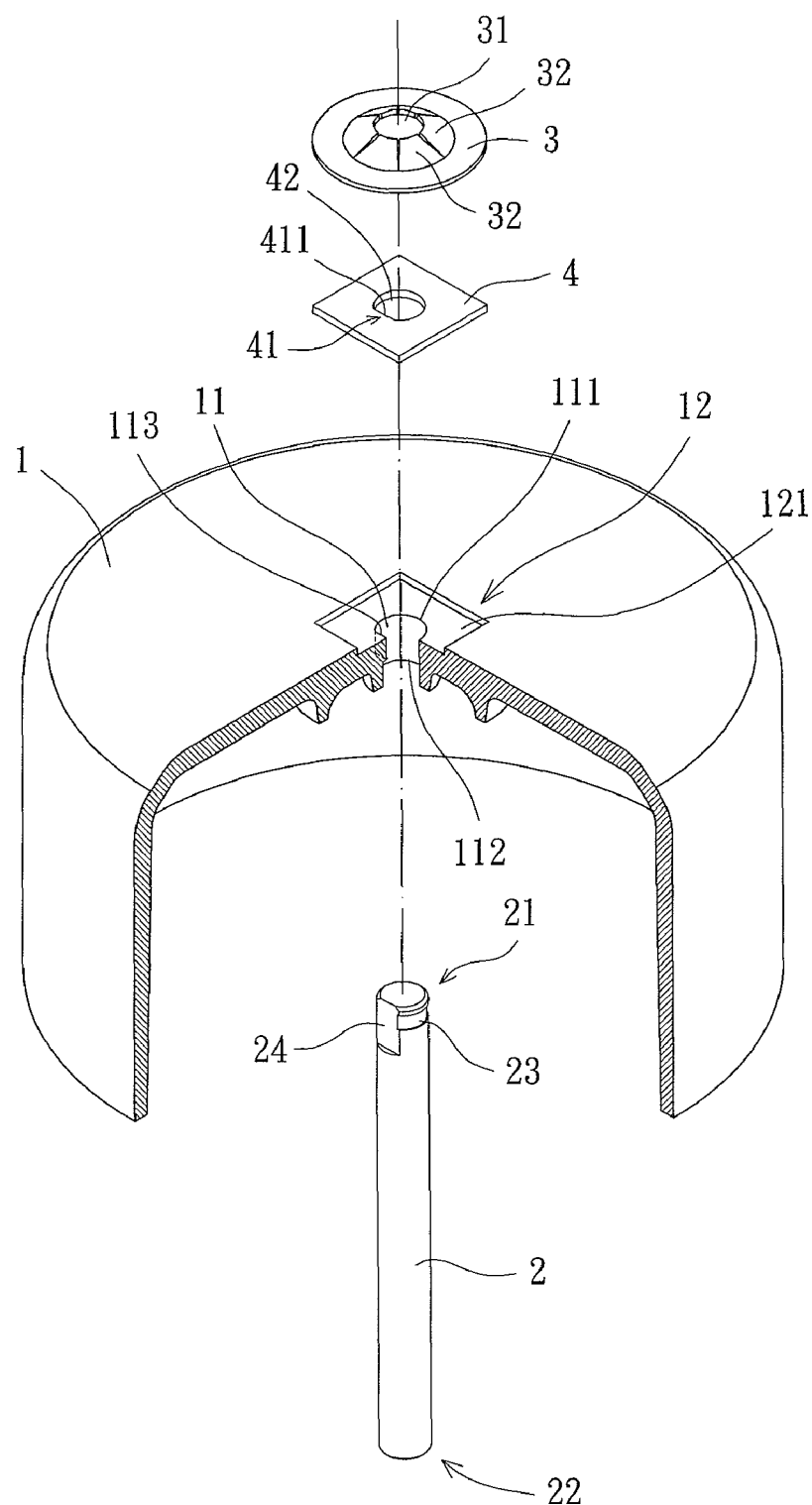
FIG. 3 shows an exploded diagram of a rotation assembly according to a first embodiment of the invention.

Referring to FIG. 3, a rotation assembly is disclosed according to a first embodiment of the invention. The rotation assembly comprises a hub 1, a shaft 2, a buckling member 3 and a fixing plate 4. The shaft 2 is coupled to the hub 1. The buckling member 3 is coupled to an end of the shaft 2 in order to prevent the shaft 2 from disengaging from the hub 1. The fixing plate 4 is coupled to the hub 1 to better prevent the shaft 2 from rotating about the hub 1.

The hub 1 is preferably made of a plastic material in an integral injection molding. The hub 1 has a through-hole 11 extending from an outer face to an inner face thereof so that a first opening 111 and a second opening 112 opposing to the first opening 111 are formed on two faces thereof. A fixing portion 113 is formed on an inner circumferential wall of the through-hole 11. The fixing portion 113 may be of any structure capable of preventing undesired rotation of the shaft 2 in the hub 1. In the embodiment, the fixing portion 113 is preferably of a plane face. The hub 1 has an assembling portion 12 surrounding the first opening 111.

The shaft 2 is inserted into the through-hole 11 of the hub 1 and has a first end 21 and a second end 22 extending out of the through-hole 11. In addition, the shaft 2 has a fixing slot 23 and a restrain portion 24 between the first end 21 and second end 22. The fixing slot 23 and the restrain portion 24 are preferably located adjacent to the first end 21. The restrain portion 24 may be of any structure capable of preventing undesired rotation of the shaft 2 in the hub 1. In the embodiment, the restrain portion 24 is preferably of a plane face which abuts with the plane face of the fixing portion 113. When the shaft 2 is inserted into the through-hole 11, the fixing slot 23 and restrain portion 24 may be fully or partially exposed out of the first opening 111 for coupling with the buckling member 3 and the fixing plate 4, as elaborated later.

The buckling member 3 is buckled into the fixing slot 23 of the shaft 2 in order to prevent the shaft 2 from disengaging from the through-hole 11 of the hub 1. In the embodiment, the buckling member 3 has a through-hole 31, with a plurality of resilient panels 32 extending from a circumference of the through-hole 31. Based on this, the through-hole 31 may allow the shaft 2 to pass therethrough so that the resilient panels 32 may be buckled into the fixing slot 23 of the shaft 2. Thus, the shaft 2 is prevented from disengaging from the hub 1.

The fixing plate 4 is of a plate form preferably made of a metal material. Alternatively, the plate form may be made of any materials with hardness larger than that of the hub 1. The fixing plate 4 is stuffed into the assembling portion 12 of the hub 1 in order to place the fixing plate 4 in a proper location on the hub 1. The fixing plate 4 has an abutting portion 41 abutting with the restrain portion 24 of the shaft 2 for preventing the shaft 2 from rotating about the hub 1.

Specifically, after the fixing plate 4 is properly positioned on the hub 1, the abutting portion 41 is further used to abut with the restrain portion 24 of the shaft 2 so that the shaft 2 is better prevented from rotating about the hub 1. The structures for which the fixing plate 4 is positioned on the hub 1, as well as the structures for which the abutting portion 41 abuts with the restrain portion 24, may be substantially categorized into the following categories below.

Figure 4:
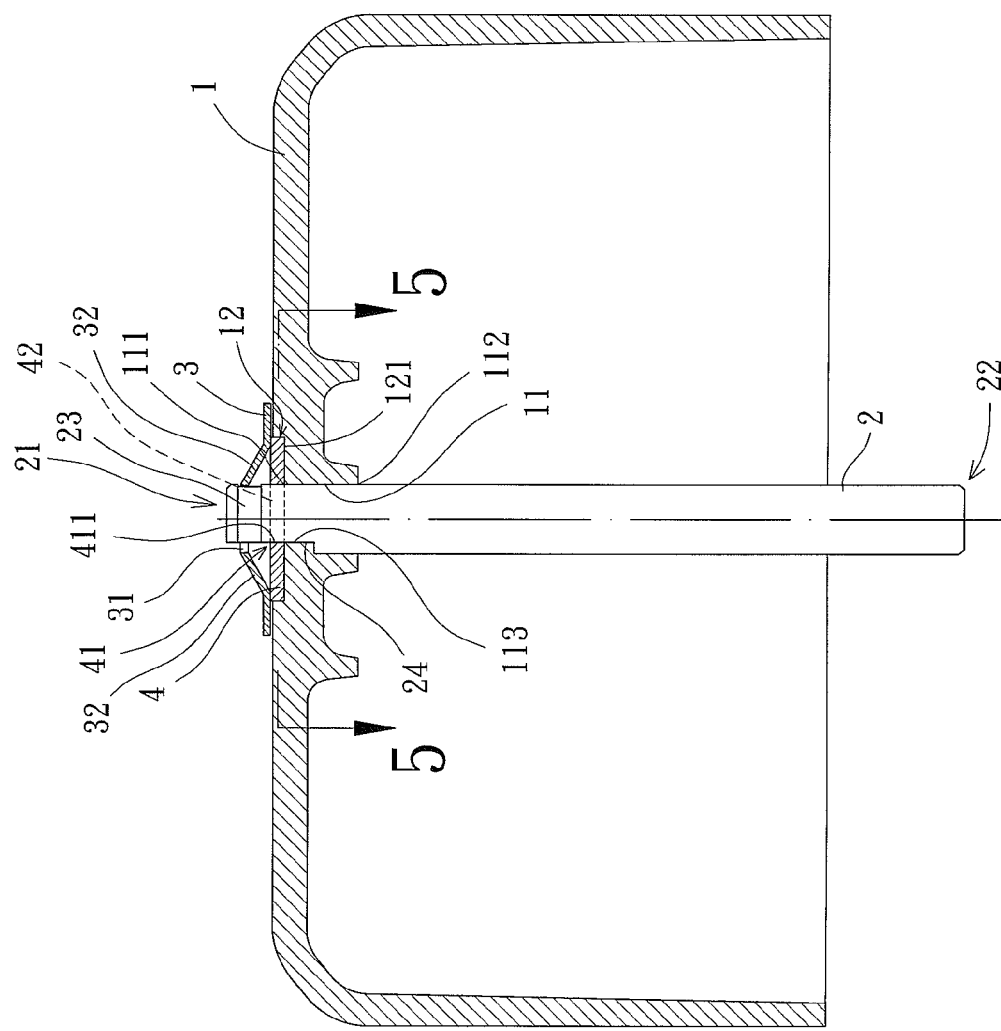
FIG. 4 shows a side cross-sectional view of the rotation assembly according to the first embodiment of the invention.
Figure 5:
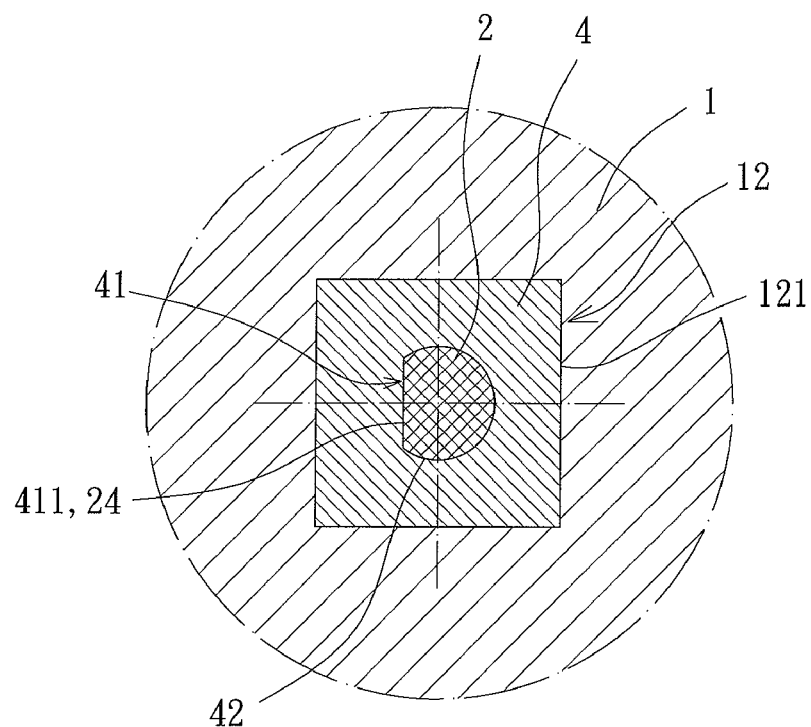
FIG. 5 shows a local upper cross-sectional view of the rotation assembly of the first embodiment observed from the number 5-5 in FIG. 4.

Referring to FIGS. 3 to 5, a preferred implementation of the rotation assembly is shown according to the first embodiment of the invention. The assembling portion 12 of the hub 1 is of a concave surface 121 surrounding the first opening 111. The fixing plate 4 is stuffed into the concave surface 121 and has a through-hole 42 for the shaft 2 to pass therethrough. The abutting portion 41 of the fixing plate 4 is of a plane edge 411 formed on an inner circumferential wall of the through-hole 42. The plane edge 411 may abut with the plane face of the restrain portion 24. As shown in FIGS. 3 and 5, the radial cross section of the concave surface 121 is in the same shape as that of the fixing plate 4 so that the fixing plate 4 may be positioned in the concave surface 121. Thus, undesired rotation of the fixing plate 4 in the concave surface 121 may be avoided. As the abutting portion 41 further abuts with the restrain portion 24 of the shaft 2, the shaft 2 is better prevented from rotating about the hub 1 via the use of the fixing plate 4.

Figure 6:
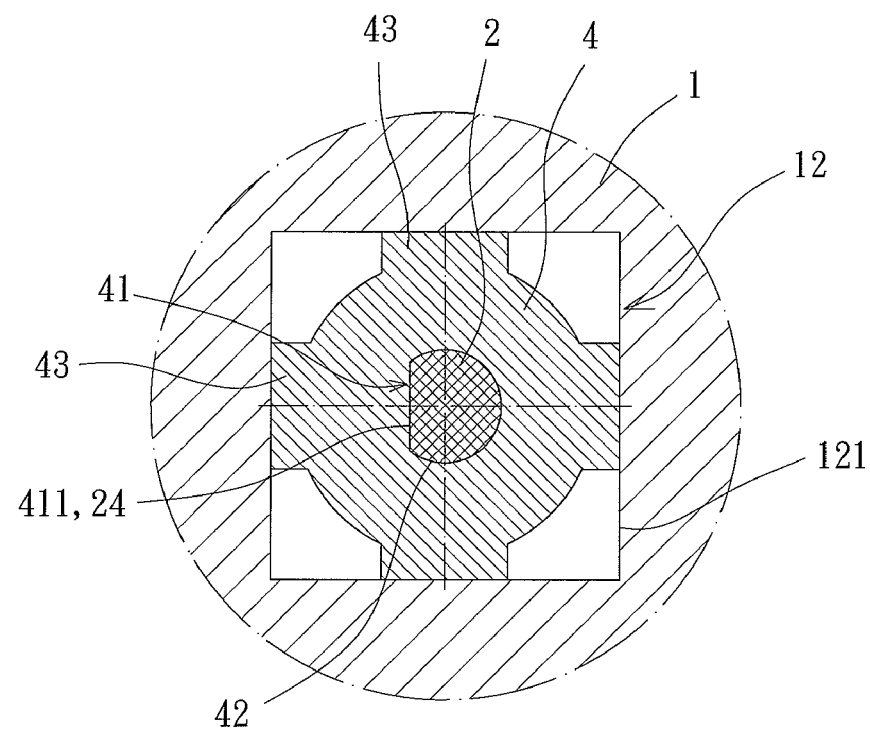
FIG. 6 shows a local upper cross-sectional view of the rotation assembly of the first embodiment according to another implementation of the invention.

Referring to FIG. 6, another preferred implementation of the rotation assembly is shown. In the embodiment, the fixing plate 4 is shown to have some modifications. Specifically, the fixing plate 4 is of a circle having a plurality of protrusions 43 extending from a circumference thereof. The protrusions 43 abut with an inner lateral wall of the concave surface 121 so that the fixing plate 4 may be positioned in the concave surface 121, preventing the shaft 2 from rotating about the hub 1.

Figure 7:
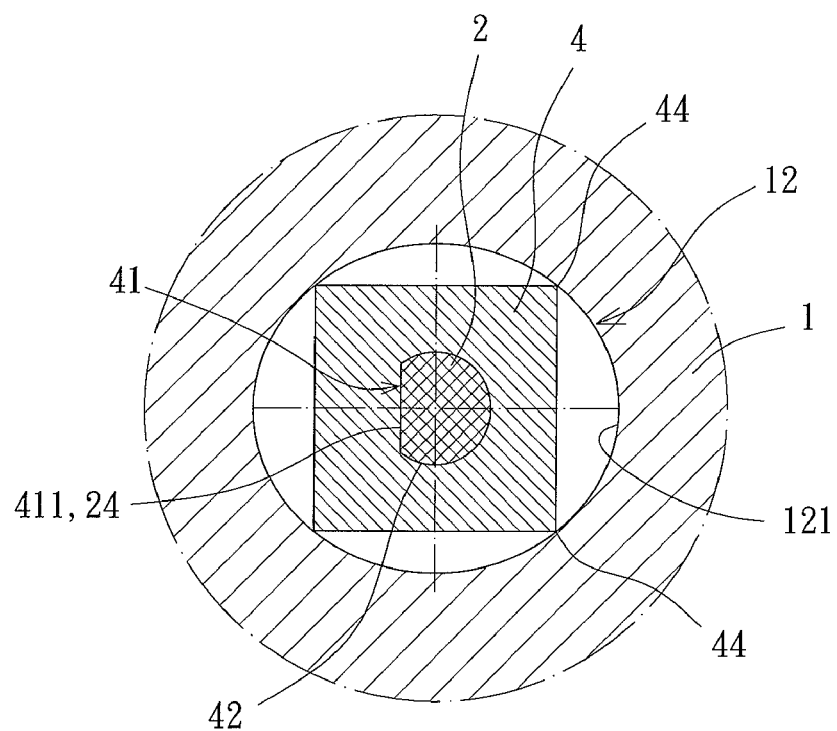
FIG. 7 shows a local upper cross-sectional view of the rotation assembly of the first embodiment according to still another implementation of the invention.

Referring to FIG. 7, another preferred implementation of the rotation assembly is shown. In the embodiment, the concave surface 121 is shown to have some modifications and the fixing plate 4 has a plurality of corners. In this embodiment, the radial cross section of the concave surface 121 is in different shape from that of the fixing plate 4; even so, undesired rotation of the fixing plate 4 in the concave surface 121 may still be prevented by abutting at least one of the corners of the fixing plate 4 with an inner circumferential wall of the concave surface 121. For example, referring to FIG. 7, the radial cross section of the concave surface 121 is shown to be in an oval form and the radial cross section of the fixing plate 4 is shown to be in a rectangular form. Based on this, all corners 44 of the fixing plate 4 may abut with the inner circumferential wall of the concave surface 121 in order to prevent the shaft 2 from rotating about the hub 1. In another embodiment, assume that the radial cross section of the fixing plate 4 is in a square form (not shown) and the radial cross section of the concave surface 121 is in a parallelogram form; based on this, two opposing corners of the fixing plate 4 may abut with the inner circumferential wall of the concave surface 121 (not shown). Thus, the shaft 2 is also prevented from rotating about the hub 1. Therefore, although the concave surface 121 has different radial cross-sectional shape from that of the fixing plate 4, undesired rotation of the fixing plate 4 in the concave surface 121 may still be prevented based on the technical concepts described above.

Figure 8:
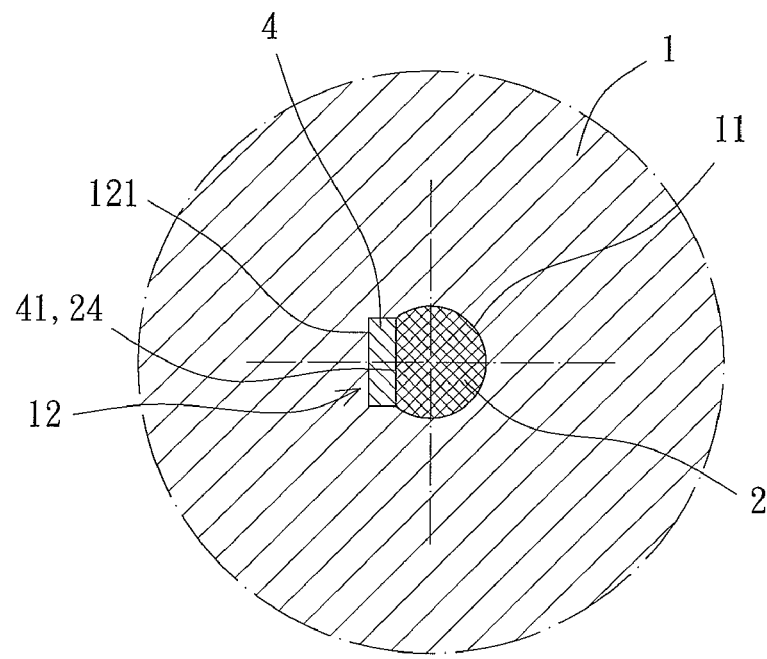
FIG. 8 shows a local upper cross-sectional view of the rotation assembly of the first embodiment according to still another implementation of the invention.

Referring to FIG. 8, another preferred implementation of the rotation assembly is shown. In the embodiment, the fixing plate 4 and the concave surface 121 are shown to have some modifications. Specifically, the fixing plate 4 is of a block positioned in the concave surface 121 in order to avoid undesired rotation of the fixing plate 4 in the concave surface 121. The fixing plate 4 may be positioned in the concave surface 121 by ways of coupling, fixing or adhesion and so on. Furthermore, the fixing plate 4 has an abutting portion 41 on a side thereof for abutting with the plane face of the restrain portion 24 of the shaft 2. Thus, the shaft 2 is prevented from rotating about the hub 1 via the use of the fixing plate 4.

Figure 9:
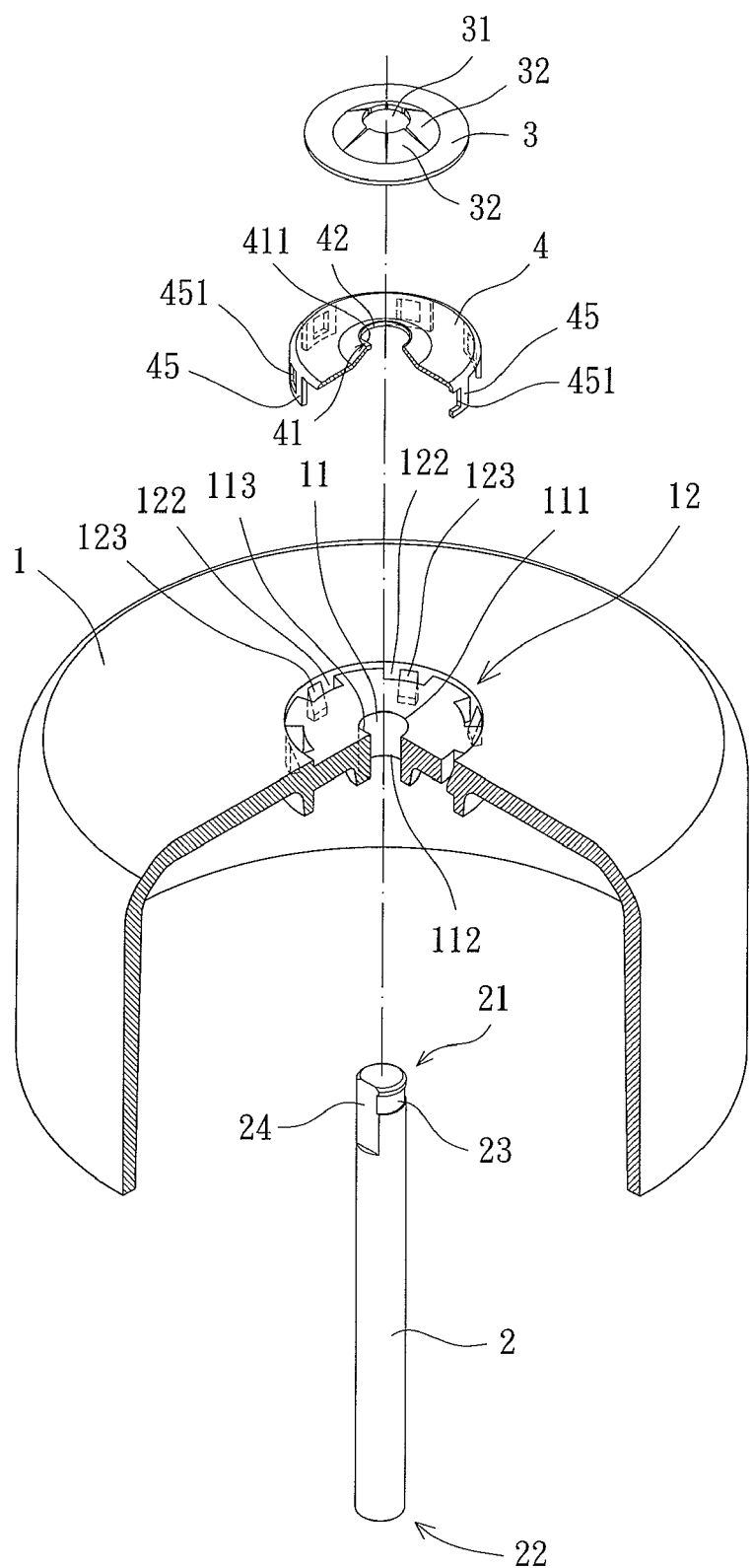
FIG. 9 shows an exploded diagram of the rotation assembly of the first embodiment when a fixing plate of the rotation assembly has a plurality of claws.
Figure 10:
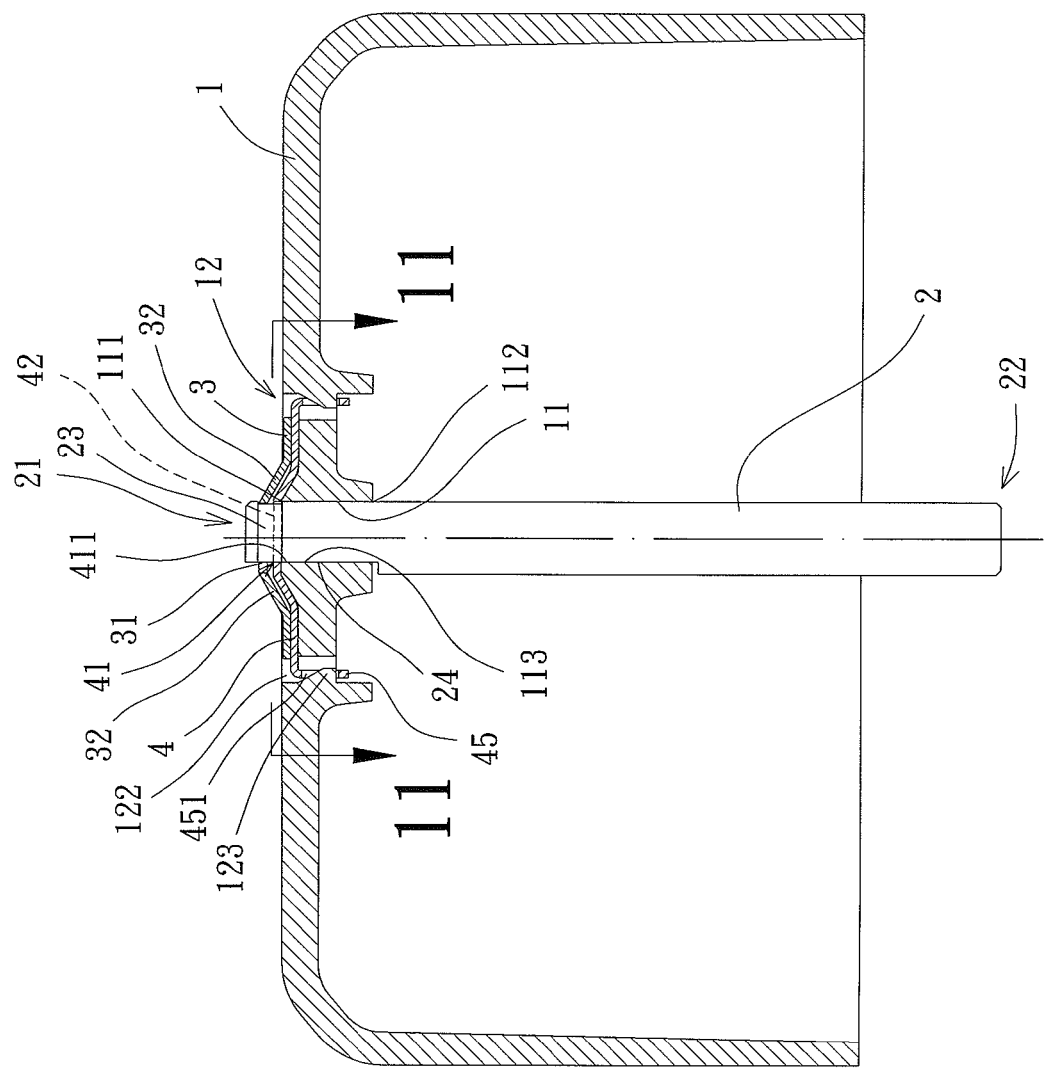
FIG. 10 shows a side cross-sectional view of the rotation assembly of the first embodiment when the fixing plate of the rotation assembly has the claws.
Figure 11:
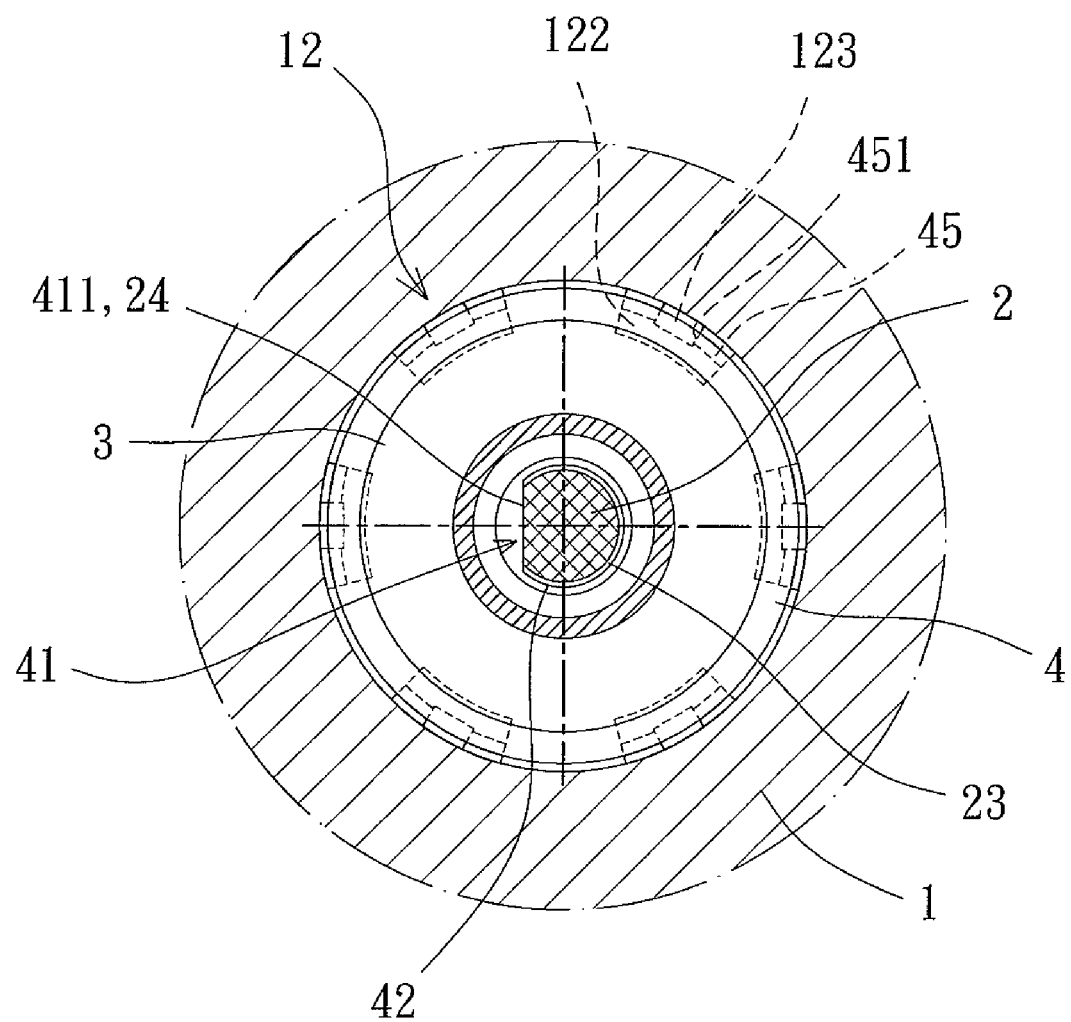
FIG. 11 shows a local upper cross-sectional view of the rotation assembly observed from the number 11-11 in FIG. 10.

Referring to FIGS. 9 to 11, another preferred implementation of the rotation assembly is shown. In the embodiment, the assembling portion 12 of the hub 1 and the fixing plate 4 are shown to have some modifications. Specifically, the assembling portion 12 of the hub 1 is shown to be a plurality of coupling holes 122 surrounding the first opening 111 (or may only be one coupling hole 122, depending on requirements). The fixing plate 4 has a plurality of claws 45, each being coupled to a corresponding coupling hole 122. In addition, the fixing plate 4 also has a through-hole 42 to be passed by the shaft 2, as well as an abutting portion 41 being a plane edge 411 formed on a circumference of the through-hole 42. The plane edge 411 may abut with the plane face of the restrain portion 24 of the shaft 2. As shown in FIGS. 9 to 11, each claw 45 of the fixing plate 4 has a clip hole 451 and each coupling hole 122 of the assembling portion 12 has a clip 123. The clip holes 451 are buckled with the clips 123 when coupling the fixing plate 4 to the hub 1 in order to prevent the claws 45 from disengaging from the coupling holes 122. Thus, the fixing plate 4 may be better positioned in the assembling portion 12 of the hub 1, avoiding undesired rotation of the fixing plate 4. Furthermore, through the abutting relation between the abutting portion 41 and the restrain portion 24 of the shaft 2, the shaft 2 may be prevented from rotating about the hub 1 via the use of the fixing plate 4.

Figure 12:
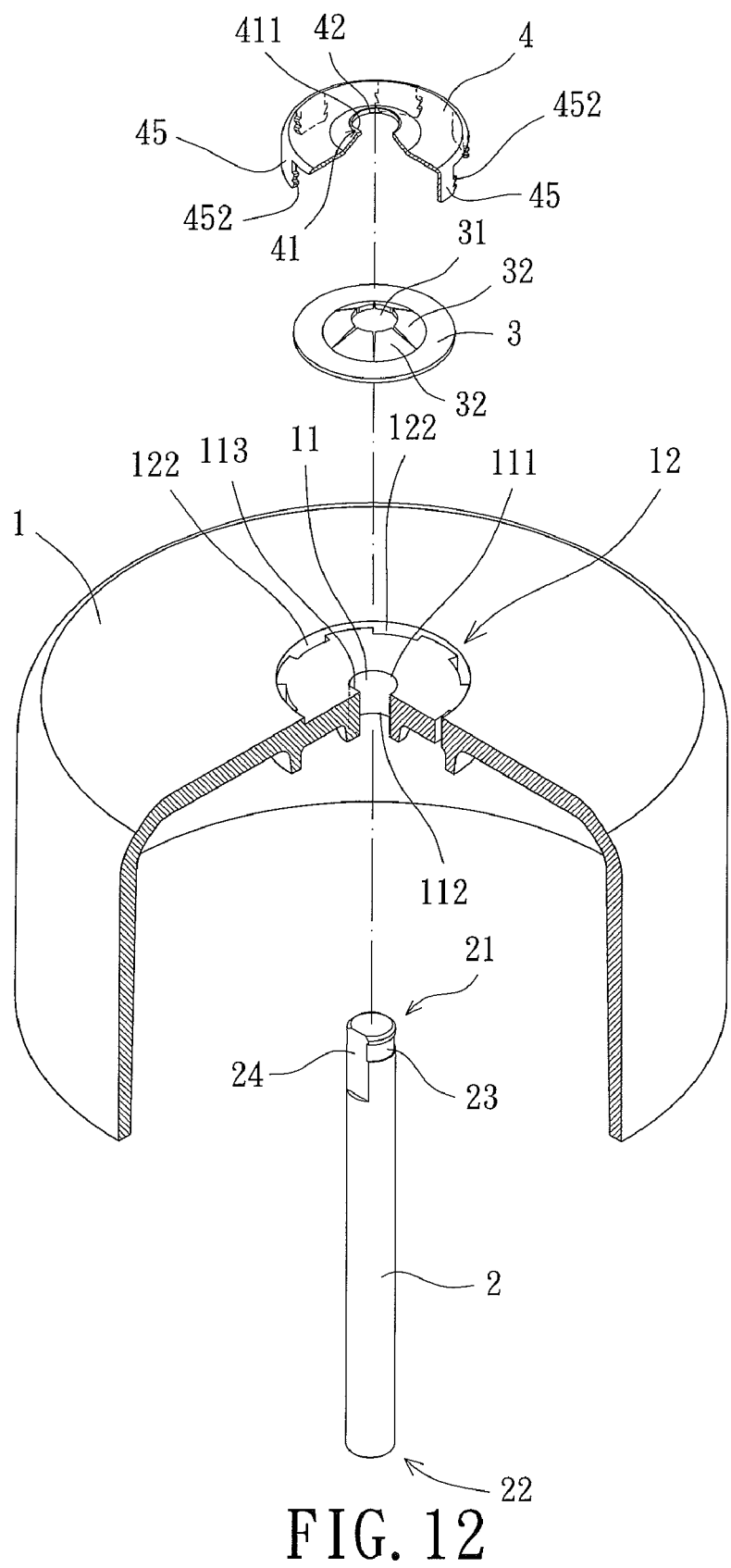
FIG. 12 shows an exploded diagram of the rotation assembly of the first embodiment when a fixing plate of the rotation assembly has a plurality of claws, according to another implementation of the invention.
Figure 13:
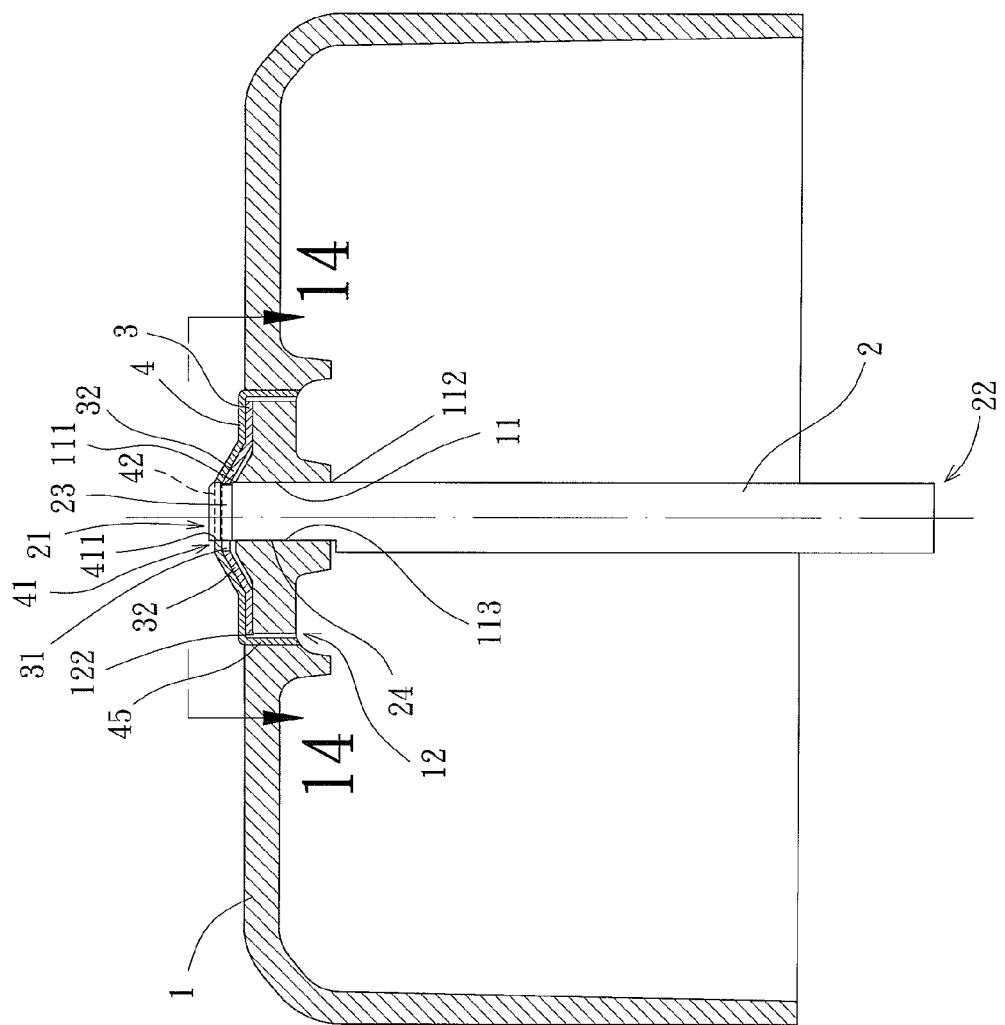
FIG. 13 shows a side cross-sectional view of the rotation assembly of the first embodiment when the fixing plate of the rotation assembly has the claws, according to another implementation of the invention.
Figure 14:
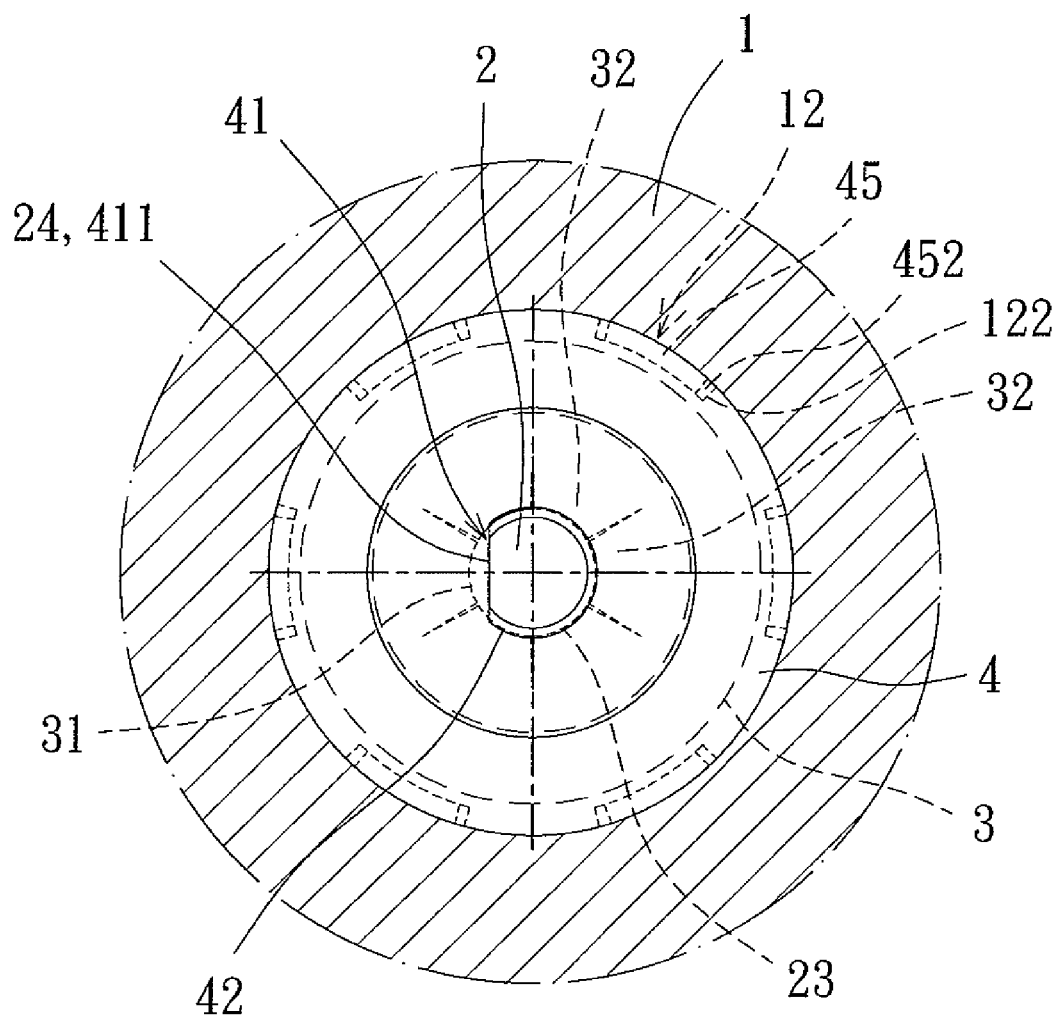
FIG. 14 shows a local upper cross-sectional view of the rotation assembly observed from the number 14-14 in FIG. 13.

Referring to FIGS. 12 to 14, another preferred implementation of the rotation assembly is shown. In the embodiment, the fixing plate 4 and the assembling portion 12 are shown to have some modifications. In this embodiment, the coupling holes 122 do not have the clips 123 and the claws 45 do not have the clip holes 451. Instead, each claw 45 has a plurality of hooks 452 hooking an inner wall of the coupling holes 122 when the fixing plate 4 is coupled to the hub 1. Thus, the claws 45 are prevented from disengaging from the coupling holes 122 and the shaft 2 is prevented from rotating about the hub 1 via the use of the fixing plate 4.

As shown in FIGS. 3 to 11, the fixing plate 4 is disposed between the hub 1 and buckling member 3. Alternatively, the buckling member 3 may also be disposed between the hub 1 and fixing plate 4. Furthermore, the hub 1 may have a plurality of vanes (not shown) extending radially along an outer circumferential surface thereof so that the hub 1 may serve as a cooling fan for various applications.

The proposed rotation assembly may be applied to various motors such as inner-rotor-type motors, motors with non-integrally formed shaft or other types of motors. Based on the structural features described above, the proposed rotation assembly is characterized by that the shaft 2 is efficiently prevented from rotating about the hub 1 not only based on the abutting relation between the fixing portion 113 and the restrain portion 24, but also the abutting relation between the abutting portion 41 and the restrain portion 24 when the fixing plate 4 is positioned in the assembling portion 12 of the hub 1. Therefore, when the proposed rotation assembly is applied to a motor under a long-term operation, the performance of the rotation assembly may be assured as loosening of the shaft 2 is prevented and noises generated are reduced. Alternatively, since the fixing plate 4 is preferably made of a metal material or materials with hardness larger than that of the hub 1, the hardness of the fixing plate 4 is assumed to be large enough for preventing the shaft 2 from rotating about the hub 1. In this case, the fixing portion 113 of the hub 1 may not be needed anymore. In other words, the rotation assembly may operate based on the absence of the fixing portion 113 without affecting the performance thereof. Thus, simpler structure of the rotation assembly is achieved.

Figure 15:
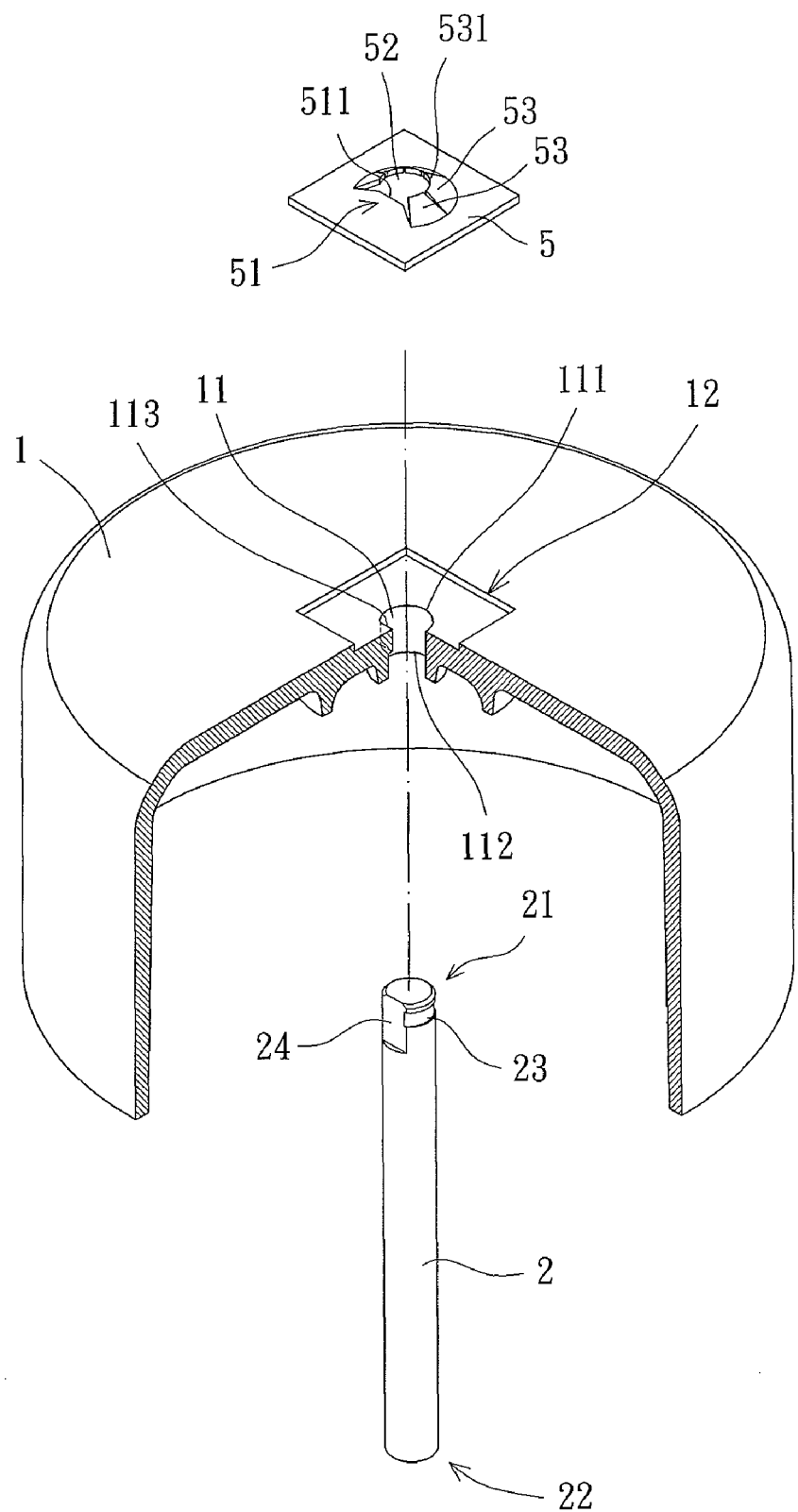
FIG. 15 shows an exploded diagram of a rotation assembly according to a second embodiment of the invention.
Figure 16:
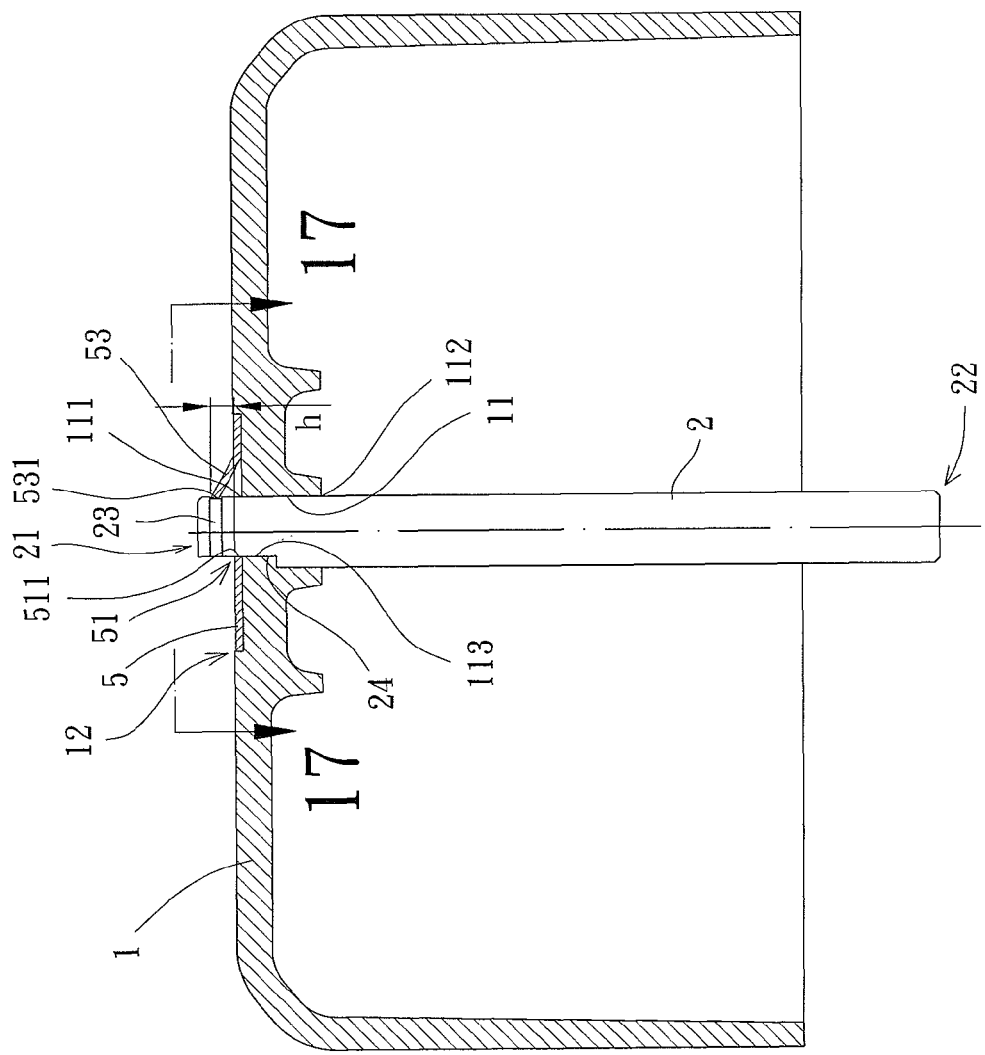
FIG. 16 shows a side cross-sectional view of the rotation assembly according to the second embodiment of the invention.
Figure 17:
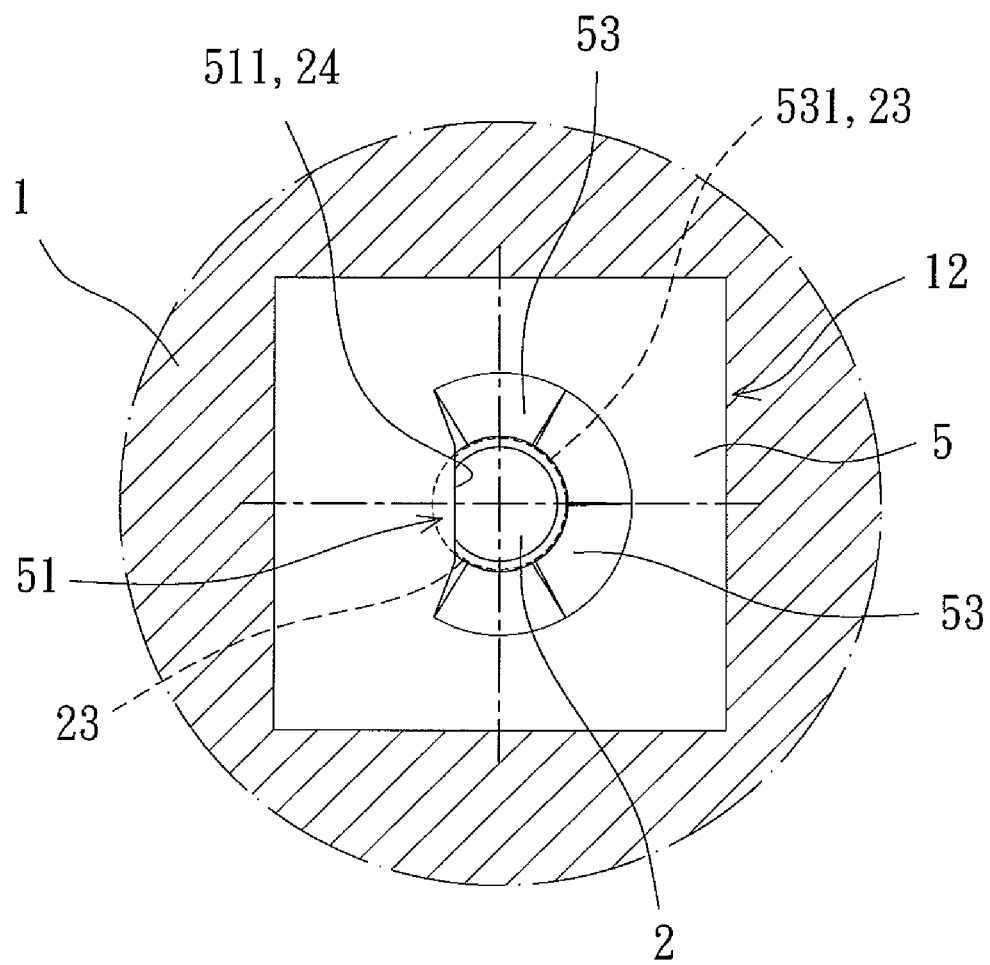
FIG. 17 shows a local upper cross-sectional view of the rotation assembly of the second embodiment observed from the number 17-17 in FIG. 16.

Referring to FIGS. 15 to 17, a rotation assembly is disclosed according to a second embodiment of the invention. The rotation assembly comprises a hub 1, a shaft 2 and a fixing plate 5. The structures of the hub 1 and shaft 2 have been described above, so they are not described herein again for brevity.

The rotation assembly in the second embodiment is differed from that of the first embodiment by that the buckling member 3 of the first embodiment may be integrated with the fixing plate 5. The fixing plate 5 is preferably made of a metal material or materials with hardness larger than that of the hub 1. To position the fixing plate 5 on the hub 1, the fixing plate 5 is coupled to the assembling portion 12 of the hub 1 and the fixing slot 23 of the shaft 2 when the first end 21 of the shaft 2 extends out of the first opening 111. Thus, the shaft 2 is prevented from disengaging from the hub 1. The fixing plate 5 has an abutting portion 51 abutting with the restrain portion 24 of the shaft 2 so that the shaft 2 is prevented from rotating about the hub 1. In addition, the fixing plate 5 has a through-hole 52 which allows the shaft 2 to pass therethrough and has a plurality of resilient panels 53 extending inward from an inner circumferential wall thereof. Each resilient panel 53 has a terminal end 531 extending into the fixing slot 23 of the shaft 2 so that the fixing plate 5 may be better coupled to the shaft 2. Thus, the shaft 2 may be prevented from disengaging from the hub 1 via the use of the fixing plate 5.

Specifically, when the restrain portion 24 is a plane face formed on an outer circumferential face of the shaft 2, the abutting portion 51 may be a plane edge 511 formed on an inner circumferential wall of the through-hole 52. The abutting portion 51 abuts with the plane face of the restrain portion 24 so that the shaft 2 is prevented from rotating about the hub 1. As shown in FIG. 16, a height H is formed between the terminal ends 531 and the abutting portion 51 in an axial direction of the shaft 2. In this way, the abutting portion 51 may better abut with the restrain portion 24 when the terminal ends 531 extend into the fixing slot 23 of the shaft 2.

The rotation assembly in the second embodiment is characterized by that the fixing plate 5 may efficiently prevent the shaft 2 from rotating about the hub 1 when the fixing plate 5 is properly positioned in the assembling portion 12 of the hub 1. More importantly, since the fixing plate 5 is capable of preventing the shaft 2 from disengaging from the hub 1, the rotation assembly in the second embodiment may omit the buckling member 3 used in the first embodiment. Thus, fewer components are used and simple structure is achieved. Furthermore, one skilled in the art would appreciate that the structural designs for which the fixing plate 5 is positioned on the hub 1 may be referred to the implementations disclosed in FIGS. 3 to 14, so they are not described herein again for brevity.

Based on the above descriptions, the invention efficiently prevents the shaft 2 from rotating about the hub 1 by using the fixing plates 4 and 5. Thus, when the proposed rotation assembly is applied to various motors, the invention has achieved advantages such as simple structure and improved performance for the motors.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A rotation assembly for a motor, comprising:
    a hub having a through-hole and an assembling portion, wherein the through-hole has a first opening and a second opening opposing to the first opening, and the assembling portion is located surrounding the first opening;
    a shaft inserted into the through-hole of the hub and having a first end and a second end, wherein a fixing slot and a restrain portion are located between the first end and the second end;
    a buckling member coupled to the fixing slot of the shaft so as to prevent the shaft from disengaging from the hub; and
    a fixing plate coupled to the assembling portion of the hub and having an abutting portion abutting with the restrain portion of the shaft for preventing the shaft from rotating about the hub.

2. The rotation assembly for the motor as claimed in claim 1, wherein the assembling portion of the hub is a concave surface to which the fixing plate is coupled.

3. The rotation assembly for the motor as claimed in claim 2, wherein a radial cross section of the concave surface is in the same shape as that of the fixing plate.

4. The rotation assembly for the motor as claimed in claim 2, wherein the fixing plate is a circle having a plurality of protrusions extending from a circumference thereof, and the protrusions abut with an inner lateral wall of the concave surface.

5. The rotation assembly for the motor as claimed in claim 2, wherein a radial cross section of the concave surface is in different shape from that of the fixing plate, the fixing plate has a plurality of corners and at least one of the corners abuts with an inner circumferential wall of the concave surface.

6. The rotation assembly for the motor as claimed in claim 5, wherein the radial cross section of the concave surface is in an oval form and the radial cross section of the fixing plate is in a rectangular form, and the corners abut with the inner circumferential wall of the concave surface.

7. The rotation assembly for the motor as claimed in claim 1, wherein the fixing plate has a through-hole to be passed by the shaft, and the abutting portion is formed on an inner circumferential wall of the through-hole.

8. The rotation assembly for the motor as claimed in claim 7, wherein the restrain portion is a plane face formed on an outer circumferential face of the shaft and the abutting portion is a plane edge abutting with the plane face.

9. The rotation assembly for the motor as claimed in claim 1, wherein the fixing plate is a block and the abutting portion is formed on a side of the block.

10. The rotation assembly for the motor as claimed in claim 9, wherein the restrain portion is a plane face formed on an outer circumferential face of the shaft for abutting with the side of the block.

11. The rotation assembly for the motor as claimed in claim 1, wherein the assembling portion of the hub comprises at least one coupling hole surrounding the first opening, and the fixing plate has at least one claw coupled to the at least one coupling hole.

12. The rotation assembly for the motor as claimed in claim 11, wherein each of the at least one coupling hole has a clip and each of the at least one claw has a clip hole buckled with the clip.

13. The rotation assembly for the motor as claimed in claim 11, wherein each of the at least one claw has a plurality of hooks hooking an inner wall of a respective one of the at least one coupling hole.

14. The rotation assembly for the motor as claimed in claim 1, wherein the fixing plate is made of a metal material.

15. The rotation assembly for the motor as claimed in claim 1, wherein the through-hole has a fixing portion formed on an inner circumferential wall thereof for abutting with the restrain portion of the shaft.

16. The rotation assembly for the motor as claimed in claim 15, wherein the fixing portion is a plane face.

17. The rotation assembly for the motor as claimed in claim 1, wherein the hub has a plurality of vanes extending radially along an outer circumferential surface thereof.

18. A rotation assembly for a motor, comprising:
    a hub having a through-hole and an assembling portion, wherein the through-hole has a first opening and a second opening opposing to the first opening, and the assembling portion is located around the first opening;
    a shaft inserted into the through-hole of the hub and having a first end and a second end, wherein a fixing slot and a restrain portion are located between the first end and second end; and
    a fixing plate coupled to the fixing slot of the shaft and the assembling portion of the hub and having an abutting portion abutting with the restrain portion of the shaft for preventing the shaft from rotating about the hub.

19. The rotation assembly for the motor as claimed in claim 18, wherein the fixing plate has a through-hole which allows the shaft to pass therethrough and has a plurality of resilient panels extending inward from an inner circumferential wall thereof, and each of the resilient panels has a terminal end extending into the fixing slot of the shaft.

20. The rotation assembly for the motor as claimed in claim 19, wherein the restrain portion is a plane face formed on an outer circumferential face of the shaft and the abutting portion is a plane edge.

21. The rotation assembly for the motor as claimed in claim 20, wherein a height is formed between the terminal ends of the resilient panels and the plane edge in an axial direction of the shaft.

22. The rotation assembly for the motor as claimed in claim 18, wherein the assembling portion of the hub is a concave surface to which the fixing plate is coupled.

23. The rotation assembly for the motor as claimed in claim 22, wherein a radial cross section of the concave surface is in the same shape as that of the fixing plate.

24. The rotation assembly for the motor as claimed in claim 22, wherein the fixing plate is a circle having a plurality of protrusions extending from a circumference thereof, and the protrusions abut with an inner lateral wall of the concave surface.

25. The rotation assembly for the motor as claimed in claim 22, wherein a radial cross section of the concave surface is in different shape from that of the fixing plate, the fixing plate has a plurality of corners and at least one of the corners abuts with an inner circumferential wall of the concave surface.

26. The rotation assembly for the motor as claimed in claim 18, wherein the assembling portion of the hub comprises at least one coupling hole surrounding the first opening, and the fixing plate has at least one claw coupled to the at least one coupling hole.

27. The rotation assembly for the motor as claimed in claim 26, wherein each of the at least one coupling hole has a clip and each of the at least one claw has a clip hole buckled with the clip.

28. The rotation assembly for the motor as claimed in claim 26, wherein each of the at least one claw has a plurality of hooks hooking an inner wall of a respective one of the at least one coupling hole.

29. The rotation assembly for the motor as claimed in claim 18, wherein the fixing plate is made of a metal material.

30. The rotation assembly for the motor as claimed in claim 18, wherein the through-hole has a fixing portion formed on an inner circumferential wall thereof for abutting with the restrain portion of the shaft.

31. The rotation assembly for the motor as claimed in claim 18, wherein the hub has a plurality of vanes extending radially along an outer circumferential surface thereof.

* * * * *